United States Patent [19]

Mallinson

[11] Patent Number: 4,666,237
[45] Date of Patent: May 19, 1987

[54] OPTICAL FIBRE TERMINATIONS AND METHODS OF AND APPARATUS FOR MAKING OPTICAL FIBRE TERMINATIONS

[75] Inventor: Stephen R. Mallinson, Ipswich, England

[73] Assignee: British Telecommunications public limited company, England

[21] Appl. No.: 574,354

[22] Filed: Jan. 27, 1984

[30] Foreign Application Priority Data

Jan. 27, 1983 [GB] United Kingdom ............... 8302320

[51] Int. Cl.⁴ ................................... G02B 6/36
[52] U.S. Cl. ............... 350/96.20; 350/96.10
[58] Field of Search ............ 350/96.20, 96.21

[56] References Cited

U.S. PATENT DOCUMENTS

| 4,190,317 | 2/1980 | Makuch | 350/96.20 |
| 4,205,896 | 6/1980 | Borsuk | 350/96.20 |
| 4,362,356 | 12/1982 | Williams et al. | 350/96.20 |
| 4,447,121 | 5/1984 | Cooper et al. | 350/96.20 |
| 4,490,006 | 12/1980 | Lidholt | 350/96.20 |

FOREIGN PATENT DOCUMENTS

| 0055451 | 5/1979 | Japan | 350/96.20 |
| 0115009 | 9/1980 | Japan | 350/96.20 |
| 0101811 | 6/1982 | Japan | 350/96.20 |

OTHER PUBLICATIONS

Khoe, G., "New Coupling Techniques for Single Mode-Optical Fibre Transmission System", published by Optical Communications Conferences, 5th European Conference on Optical Communications, 2nd International Conference on Integrated Optics and Optical Fibre Communications, Amsterdam Sep. 17-19, 1979 pp. 6.1-1 to 6.1-4.

Primary Examiner—William L. Sikes
Assistant Examiner—Akm E. Ullah
Attorney, Agent, or Firm—Nixon & Vanderhye

[57] ABSTRACT

An optical fibre termination is machined to provide a locating surface having improved concentricity with a therein-mounted optical fibre by more accurately locating the optical fibre at the rotational center of a machining tool. Light transmitted through the optical fibre is monitored while the termination is adjusted, in response to such monitoring, to accurately coincide with the rotational machining axis.

13 Claims, 1 Drawing Figure

U.S. Patent
May 19, 1987
4,666,237
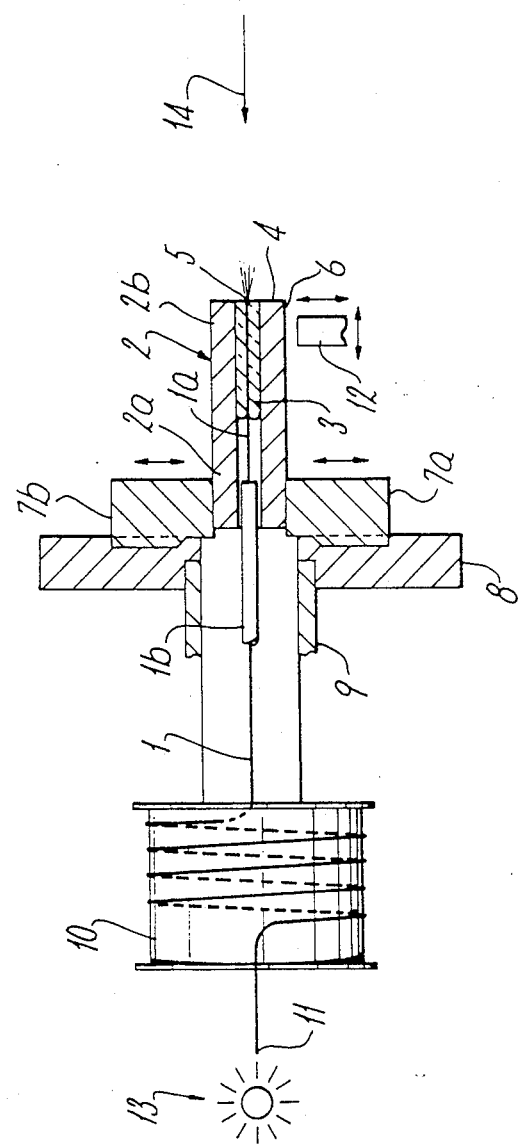

OPTICAL FIBRE TERMINATIONS AND METHODS OF AND APPARATUS FOR MAKING OPTICAL FIBRE TERMINATIONS

This invention relates to optical fibre terminations. The invention relates in particular to optical fibre terminations, and methods of and apparatus for making such terminations, in which an optical fibre end is located concentrically with a locating surface of a sleeve member.

BACKGROUND OF THE INVENTION

Terminations of optical fibres in which the end of an optical fibre is mounted in a sleeve member are frequently used, for example, in optical fibre connectors. Optical fibre connectors are understood herein to include connectors for connecting the ends of a pair of optical fibres, as well as connectors which serve to connect an end of an optical fibre to another optical component, e.g. a laser light source or a detector. In optical fibre connectors correct optical alignment of the two fibre cores, or of the fibre core and the beam axis of the optical component, is an essential requirement if undue attenuation and degradation of optical transmission in the connector is to be avoided. Both the alignment of the optical fibre core with another fibre core and the alignment of an optical fibre core with other optical components will be referred to hereinafter for the sake of brevity as fibre alignments and related terms are to be understood accordingly.

In principle, the most convenient way of ensuring correct fibre alignment could be provided by securing the fibre end in a cylindrical sleeve, whose outer cylinder surface is concentric with the core of the fibre, and transferring the alignment function to the outer cylinder surface. In practice, however, serious difficulties present themselves, and these difficulties are especially acute in the case of monomode fibres in which the core is only a few micrometers in diameter and where, consequently misalignment of only a micrometer or two can cause serious transmission losses. A variety of methods have been proposed in the past for aligning the fibre core with the axis of the cylindrical sleeve.

One approach is to machine a sleeve to its final external dimensions and subsequently insert the fibre into an axially extending through-bore of the sleeve. Thereafter the fibre is aligned with the cylinder axis and is secure in the aligned position by means of a hard setting, preferably adhesive, compound such as epoxy-resin or the like.

Another approach is intended to overcome one of the major problems with the method just referred to, which is decentering of the fibre due to non-uniform shrinkage of the compound during setting. It involves inserting and setting the fibre end approximately at the centre of the ferrule and machining the outside of the ferrule, after the compound has set, to be concentric with the fibre by the method disclosed in an article entitled "New Coupling Techniques for Single Mode-Optical Fibre Transmission System" by G. Khoe, published by Optical Communications Conferences, 5th European Conference on Optical Communications, 2nd International Conference on Integrated Optics and Optical Fibre Communications, Amsterdam Sept. 17-19, 1979 pp 6.1-1 to 6.1-4.

BRIEF SUMMARY OF THE INVENTION

The present invention is based on the appreciation that the axis about which to machine a locating surface of a sleeve member for an optical fibre termination, can be defined very conveniently by a beam of light emerging from the core at the fibre end.

Accordingly, a method of providing an optical fibre termination having a locating surface of a sleeve member concentric with the fibre core at an optical fibre end, comprises the steps of inserting the optical fibre end into the sleeve, securing the optical fibre end within the sleeve, mounting the resulting fibre termination in a rotatable clamping device of a machining tool, transmitting light through the fibre core so as to produce a light beam emerging therefrom at said fibre end, observing the light beam, adjusting the clamping device until rotation thereof produces a stationary light beam, and machining a locating surface concentric with the axis defined by the stationary light beam.

It will be readily appreciated that, as long as the fibre does not lie exactly on the axis of rotation of the clamping member, the emerging light beam with itself trace out a circle centred about the axis of rotation.

It should be noted that the pressure exerted by the cutting or grinding tool on the rotating ferrule during machining may result in a deflection of the beam which, however, is reversible and ceases on cessation of the pressure.

The locating surface is preferably cylindrical.

The optical fibre end is conveniently mounted in the sleeve by a hard-setting, usually organic, compound.

BRIEF DESCRIPTION OF THE DRAWING

The invention will now be described further by way of example and with reference to the accompanying drawing which is a schematic longitudinal section through a machine tool arrangement for carrying out the present invention.

DETAILED DESCRIPTION

Referring now also to the drawing, an optical fibre cable 1 terminates and is secured in an axial bore of ferrule 2. The optical fibre cable consists of an outer sheath 1b which terminates in a rear portion of the ferrule 2, and an optical fibre 1a. The optical fibre 1a extends forwardly from the rear portion 2a of the ferrule and terminates in the plane of the end face 4 of the ferrule 2. The optical fibre is rigidly located in the bore of the ferrule 2 by means of a hard setting compound 3, for example epoxy-resin or light curable dental adhesive. The forward portion 2b of the ferrule 2 ending in the end plane 4 is bounded by a surface 6 which, when machined, provides the cylindrical locating surface of the ferrule.

To machine the outer cylindrical surface 6 the ferrule 2 is mounted on a precision lathe, schematically illustrated as having a chuck 8, four jaws (of which only two, 7a and 7b, are shown) and a hollow head spindle 9. The head spindle 9 is chosen to have an internal diameter large enough to permit the ferrule to be passed through the spindle for mounting in the chuck 8. With the ferrule 2 mounted in the chuck 8, the optical fibre cable 1 passes through the hollow head spindle 9 to a former, or reel, 10 onto which the remaining length of the optical fibre is wound. The former 10 is mounted so as to rotate in synchronism with the spindle 9. A light source 13 is provided adjacent to end 11 of the optical fibre, the end 11 being the end of the fibre 1a remote from the ferrule 2.

The axis about which to machine the surface 6 for it to be concentric with the end 5 of the fibre 1a, is found by shining light into the end 11 of the fibre. The light is transmitted by the fibre, more particularly by the core of the fibre, and emerges as a beam of light at the end 5 of the fibre 1a. The chuck 8, and hence the ferrule 2, are then rotated. Any offset of the fibre end 5 from the axis of rotation of the chuck 8 is detected, conveniently by means of a microscope (not shown) by viewing in the direction of the arrow 14. With offset, the light emerging from the fibre end of 5 traces out a circle whose centre lies on the axis of rotation. By suitably adjusting the jaws the ferrule 2 is moved across the chuck 8 until rotation of the chuck 8 results in a stationary point of light emerging from the fibre end 5. It will be readily appreciated that in this position ferrule 2 now rotates about an axis which coincides with the fibre end 5. A grinding or cutting tool 12, when brought into contact with the surface 6 of the ferrule will, on rotation of the chuck 8, effect machining of the surface 6 concentrically with the optical fibre end 5.

In order to facilitate observation, electronic imaging techniques may be employed for observation of the light beam emerging from the fibre.

It should be noted here that in practice a jaw arrangement as illustrated in the drawing will frequently prove insufficiently precise to permit exact positioning of the ferrule 2 and recourse to clamping arrangements such as, for example, collets, may be necessary. However, including in the drawing the details of a practical precision lathe arrangement, employing for example, collets rather than moveable jaws, is considered to detract from the principles of the present invention which the drawing is intended to illustrate.

The ferrule 2 itself, illustrated in the drawing as a straight sided cylinder, will, in practice, often include flanges, stops and the like, for example, to limit insertion of the ferrule into a socket (not shown).

Connector ferrules made in accordance with the invention have been found to provide sufficiently accurate concentricity for use with monomode fibres, and have been successfully employed in optical fibre connectors of the kind described in U.S. patent application Ser. No. 555,077, "Connectors", filed Nov. 25th, 1983.

What is claimed is:

1. A method of making an optical fibre termination having a locating surface which is concentric with an optical fibre mounted therein, said method comprising the steps of:
   inserting an end of said optical fibre into a sleeve member having an axial through bore,
   securing the optical fibre end within the bore of the sleeve member, thereby to provide a fibre termination,
   mounting the fibre termination in a rotatable clamping device of a machining tool,
   transmitting light through the fibre so as to produce a light beam emerging from said fibre end,
   adjusting the rotatable clamping member until rotation thereof produces a stationary light beam defining an axis, and
   machining the locating surface about the axis defined by the stationary light beam.

2. A method as claimed in claim 1 in which the locating surface is machined to be cylindrical.

3. A method as claimed in claim 1 in which light is tramsmitted through the fibre core.

4. A method as claimed in claim 1 in which the fibre is a monomode fibre.

5. A method as claimed in claim 1 in which the sleeve member comprises an optical fibre connector ferrule.

6. A method as claimed in any claim 1 in which the light beam is observed by electronic imaging means.

7. A fibre termination made according to the method of any one of the claims 1 to 6.

8. A monomode fiber termination mode according to the method of any one of the claims 1 to 6.

9. A fibre termination as claimed in claim 7 comprising a cylindrical locating surface.

10. An optical fibre connector comprising at least one optical fibre termination having a locating surface provided in accordance with the method of any one of claims 1 to 6.

11. A method for accurately machining a cylindrical locating surface on an optical fibre termination which is concentric with an optical fibre having one end mounted therewithin, said method comprising the steps of:
    mounting said optical fibre termination within a lathe having a rotational center;
    passing light through said optical fibre and out the end thereof which is mounted within said termination;
    adjusting the relative location of said termination within said lathe until the light exiting from said optical fibre is coincident with said rotational center of the lathe; and
    machining, with said lathe, said cylindrical locating surface.

12. A method as in claim 11 wherein said adjusting step comprises:
    rotating said termination while mounted in said lathe;
    monitoring the locus of light exiting from said optical fibre during said rotating step; and
    adjusting the relative location of the termination within the lathe until said locus is substantially stationary.

13. An optical fibre termination manufactured in accordance with the method of claim 11 or 12 having an outer cylindrical locating surface which is concentric with the therein-mounted end of an optical fibre.

* * * * *